(12) United States Patent
Yoshida et al.

(10) Patent No.: US 11,262,223 B2
(45) Date of Patent: Mar. 1, 2022

(54) FLOWMETER

(71) Applicant: DENSO CORPORATION, Kariya (JP)

(72) Inventors: Yuusuke Yoshida, Nisshin (JP); Seiji Yaoko, Nisshin (JP); Kazuaki Ueda, Nisshin (JP); Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/168,908

(22) Filed: Feb. 5, 2021

(65) Prior Publication Data

US 2021/0156721 A1 May 27, 2021

Related U.S. Application Data

(63) Continuation of application No. PCT/JP2019/024444, filed on Jun. 20, 2019.

(30) Foreign Application Priority Data

Aug. 8, 2018 (JP) .............................. JP2018-149045

(51) Int. Cl.
  *G01F 1/684* (2006.01)
  *F02M 35/02* (2006.01)
  *F02M 35/10* (2006.01)
  *F02D 41/18* (2006.01)

(52) U.S. Cl.
  CPC ........... *G01F 1/6842* (2013.01); *F02D 41/18* (2013.01); *F02M 35/021* (2013.01); *F02M 35/10386* (2013.01); *G01F 1/684* (2013.01)

(58) Field of Classification Search
  CPC ..... G01F 1/6842; G01F 1/684; F02M 35/021; F02M 35/10386; F02D 41/18
  See application file for complete search history.

(56) References Cited

U.S. PATENT DOCUMENTS

| 6,185,998 | B1 | 2/2001 | Yonezawa et al. |
| 6,336,361 | B1 | 1/2002 | Uramachi et al. |
| 2002/0029629 | A1 | 3/2002 | Uramachi et al. |
| 2002/0073773 | A1 | 6/2002 | Uramachi et al. |
| 2003/0101810 | A1 | 6/2003 | Uramachi et al. |
| 2003/0209068 | A1* | 11/2003 | Yonezawa ............... G01F 1/684 73/204.22 |

(Continued)

FOREIGN PATENT DOCUMENTS

| JP | 2011-112569 | 6/2011 | |
| WO | WO-2019064887 A1 * | 4/2019 | ....... F02M 35/10393 |

*Primary Examiner* — Ryan D Walsh
(74) *Attorney, Agent, or Firm* — Nixon & Vanderhye P.C.

(57) ABSTRACT

A flowmeter is inserted into a main passage through which a target fluid flows. The flowmeter includes a housing, a sub passage, an inlet portion, an outlet portion, a flow rate detector, and a protrusion. The housing includes a side surface and a tip end surface. A part of the target fluid flows into the sub passage from the main passage. The target fluid flows into the sub passage through the inlet portion and flows out of the sub passage through the outlet portion. The flow rate detector is configured to detect a flow rate of the target fluid flowing through the sub passage. The tip end surface includes a first end area and a second end area. The protrusion protrudes from the tip end surface and is located in both the first end area and the second end area.

4 Claims, 19 Drawing Sheets

(56) References Cited

U.S. PATENT DOCUMENTS

| | | | |
|---|---|---|---|
| 2008/0307869 A1* | 12/2008 | Kamiya | G01F 1/692 |
| | | | 73/114.32 |
| 2010/0000308 A1 | 1/2010 | Ariyoshi et al. | |
| 2011/0132101 A1 | 6/2011 | Ariyoshi et al. | |
| 2011/0138927 A1 | 6/2011 | Ariyoshi et al. | |
| 2016/0377470 A1* | 12/2016 | Itou | G01F 15/14 |
| | | | 73/114.32 |
| 2019/0120674 A1 | 4/2019 | Morino et al. | |

* cited by examiner

FLOWMETER

CROSS REFERENCE TO RELATED APPLICATION

The present application is a continuation application of International Patent Application No. PCT/JP2019/024444 filed on Jun. 20, 2019, which designated the U.S. and claims the benefit of priority from Japanese Patent Application No. 2018-149045 filed on Aug. 8, 2018. The entire disclosures of all of the above applications are incorporated herein by reference.

TECHNICAL FIELD

The present disclosure relates to a flowmeter.

BACKGROUND ART

A flowmeter includes a housing disposed in the main passage and a sub passage defined in the housing. The flowmeter includes a tip blade at a tip end of the housing and the tip blade is deviated to a downstream side of the tip end. The tip blade has a shape that tapers from a base end to a tip end.

SUMMARY

A flowmeter is inserted into, and fixed to the main passage through which a target fluid flows. The flowmeter is configured to measure a flow rate of a target fluid flowing in the main passage. The flowmeter includes a housing, a sub passage, an inlet portion, an outlet portion, a flow rate detector, and a protrusion. The housing includes a side surface that extends in an insertion direction of the flowmeter and a tip end surface that is located on a side of the side surface in the insertion direction. The sub passage is defined in the housing and a part of the target fluid flows into the sub passage from the main passage. The inlet portion is defined in the side surface and the target fluid flows into the sub passage through the inlet portion from the main passage. The target fluid flows out of the sub passage into the main passage through the outlet portion. The flow rate detector is configured to detect a flow rate of the target fluid flowing through the sub passage. The protrusion protrudes from the tip end surface in the insertion direction. The tip end surface includes a first end area located close to the inlet portion and a second end area opposite to the first end area. The protrusion is located in both the first end area and the second end area.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
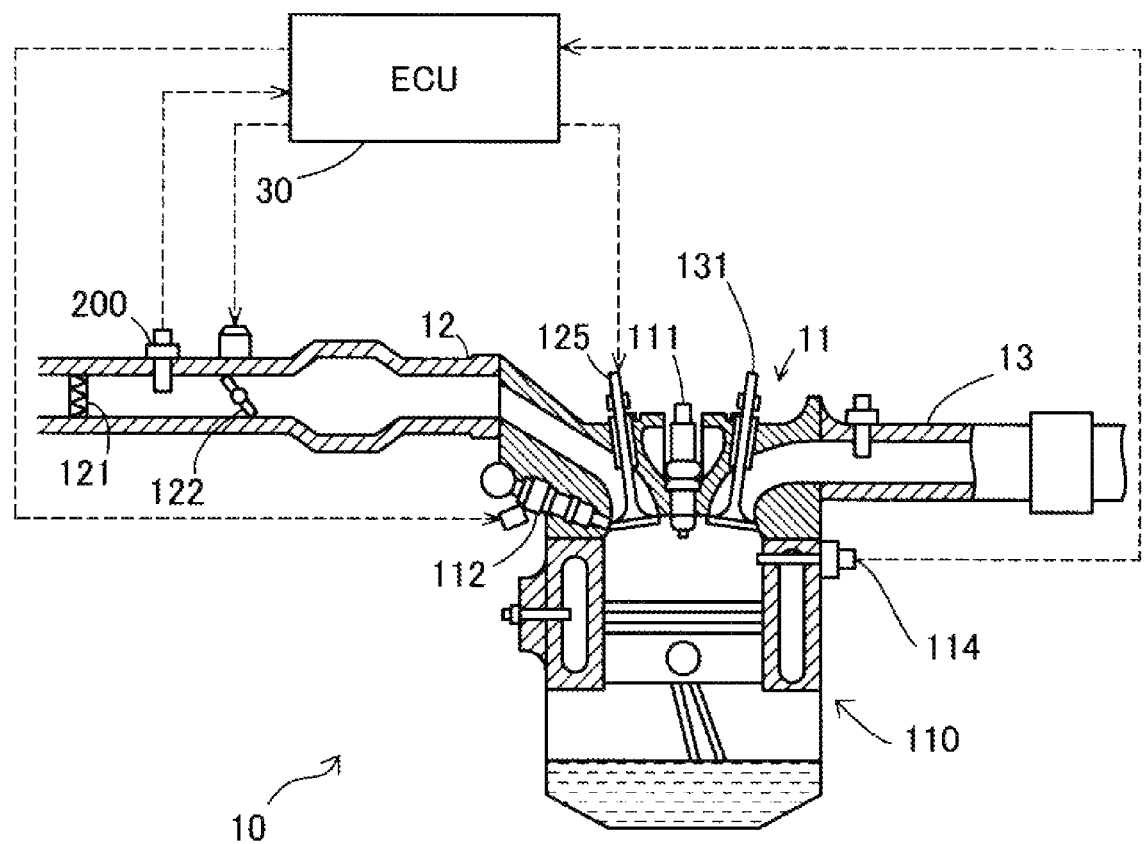
FIG. 1 is a schematic view of a combustion system using a flowmeter of an embodiment.

To begin with, examples of relevant techniques will be described.

A thermal flow meter that is configured to measure a flow rate of a target fluid flowing through a main passage has been known as a flowmeter. The flowmeter includes a housing disposed in the main passage and a sub passage defined in the housing. The flowmeter includes a tip blade at a tip end of the housing and the tip blade is deviated to a downstream side of the tip end. The tip blade has a shape that tapers from a base end to a tip end.

In the flowmeter, when a backward flow of the target fluid occurs, there is a possibility that a horizontal vortex occur near an inlet of the sub passage. If the horizontal vortex occurs near the inlet, the target fluid may flow into the sub passage along the horizontal vortex and may be measured as an amount of an intake air. Thus, a measured flow rate may have an error.

The present disclosure can be implemented in the following manners.

According to an aspect of the present disclosure, a flowmeter is inserted into, and fixed to the main passage through which a target fluid flows. The flowmeter is configured to measure a flow rate of a target fluid flowing in the main passage. The flowmeter includes a housing, a sub passage, an inlet portion, an outlet portion, a flow rate detector, and a protrusion. The housing includes a side surface that extends in an insertion direction of the flowmeter and a tip end surface that is located on a side of the side surface in the insertion direction. The sub passage is defined in the housing and a part of the target fluid flows into the sub passage from the main passage. The inlet portion is defined in the side surface and the target fluid flows into the sub passage through the inlet portion from the main passage. The target fluid flows out of the sub passage into the main passage through the outlet portion. The flow rate detector is configured to detect a flow rate of the target fluid flowing through the sub passage. The protrusion protrudes from the tip end surface in the insertion direction. The tip end surface includes a first end area located close to the inlet portion and a second end area opposite to the first end area. The protrusion is located in both the first end area and the second end area.

According to this flowmeter, the protrusion is located in both the first end area close to the inlet portion and the second end area opposite to the first end area. Thus, when the inlet portion is defined to face an upstream side of the main passage, even if the target fluid flows through the main passage both in a forward direction and a backward direction, the intake air is separated at the protrusion located on a tip side of the tip end surface in the insertion direction. Therefore, a distance between the inlet portion and a position at which the horizontal vortex caused by the separation occurs can be increased compared to a case without the protrusion. As a result, even if the target fluid flows both in the forward direction and the backward direction, the flowmeter can reduce a measuring error caused by the horizontal vortex.

A. Embodiment

As shown in FIG. 1, a flowmeter 200 of this embodiment is used for a combustion system 10 including an internal combustion engine 11. The combustion system 10 includes the internal combustion engine 11, a main passage 12 and an exhaust passage 13 that are defined by pipes, and an ECU 30. The combustion system 10 is mounted in, for example, a gasoline powered vehicle and used as a driving device.

The internal combustion engine 11 includes a combustion chamber 110, a spark plug 111, a fuel injection valve 112, a combustion pressure sensor 114, an intake valve 125, and an exhaust valve 131. The internal combustion engine 11 generates a driving force by burning a mixed gas of an air supplied into the internal combustion engine 11 through the main passage 12 and a fuel injected by the fuel injection valve 112. The spark plug 111 ignites the mixed gas (i.e., a mixture of the fuel and the air) in the combustion chamber 110 by generating a spark discharge. The fuel injection valve 112 injects a fuel into the combustion chamber 110. The combustion pressure sensor 114 is configured to detect a combustion pressure in the combustion chamber 110.

The main passage 12 and the exhaust passage 13 are connected to the combustion chamber 110. The main passage 12 is a passage to guide the air to the combustion chamber 110. The exhaust passage 13 is a passage through which the burned exhaust gas is discharged out of the combustion chamber 110.

In the main passage 12, an air cleaner 121, the flowmeter 200, and a throttle valve 122 are disposed in this order from an upstream side of the main passage 12. The air cleaner 121 removes dusts in air flowing through the main passage 12. The throttle valve 122 adjusts a resistance in the main passage 12 by adjusting an opening degree of the throttle valve 122. The flowmeter 200 is configured to measure a flow rate of the intake air flowing through the main passage 12.

The ECU 30 is a calculation processing circuit including a processor, a storage medium such as a RAM, a ROM, and a flash memory, a microcomputer including an input/output unit, and a power supply circuit. The ECU 30 controls the opening degree of the throttle valve 122 and an amount of the fuel injected by the fuel injection valve 112 using measurement results obtained from the flowmeter 200 and various sensors such as the combustion pressure sensor 114.

Figure 2:
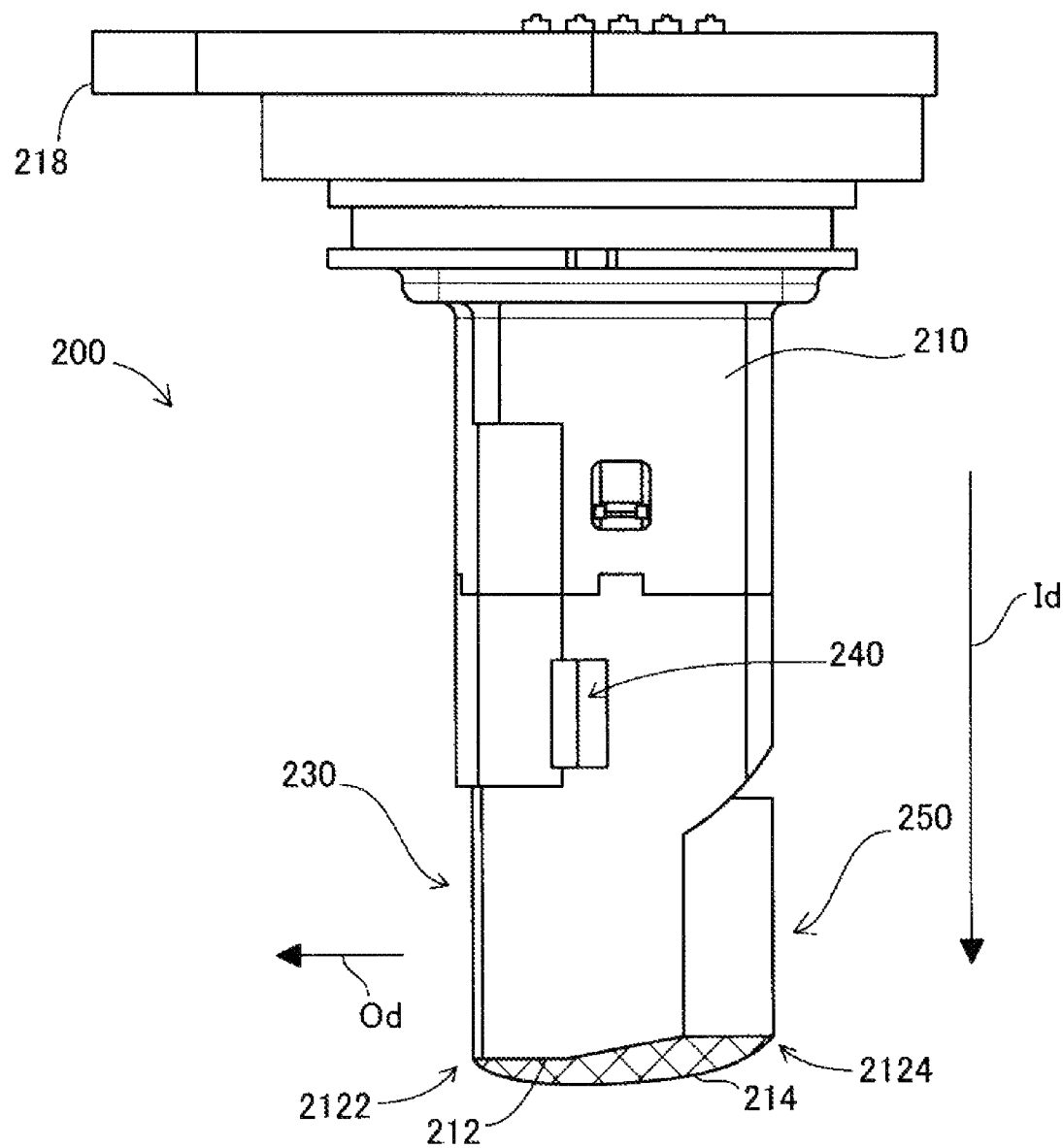
FIG. 2 is a schematic side view of the flowmeter of the embodiment.

As shown in FIG. 2, the flowmeter 200 includes a housing 210, an inlet portion 230, outlet portions 240, and an exhaust portion 250. The housing 210 includes a side surface extending in an insertion direction Id of the flowmeter and a tip end surface 212 located on a side of the side surface in the insertion direction Id. The inlet portion 230 opens in an opening direction Od and the tip end surface 212 has a first end area 2122 and a second end area 2124 opposite to the first end area in the opening direction Od. The inlet portion 230 is defined on a side of the first end area 2122. The exhaust portion 250 is defined on a side of the second end area 2124. In this embodiment, the number of the outlet portions 240 is two and the outlet portions 240 are defined in both the side surface shown in FIG. 2 and a side surface opposite to the side surface shown in FIG. 2. The two outlet portions 240 are defined in portions of the side surfaces of the housing 210 that are intersecting a side surface in which the inlet portion 230 is defined.

The flowmeter 200 includes a protrusion 214 protruding from the tip end surface 212 in the insertion direction Id. The protrusion 214 protrudes from the tip end surface 212 in the insertion direction Id and extends from the first end area 2122 to the second end area 2124. In this embodiment, the protrusion 214 does not define an inner space through which the intake air flows. An appearance of the protrusion 214 is shown by cross hatching.

In this embodiment, the protrusion 214 protrudes from the tip end surface 212 such that a length W1 between a lower end of an opening of the exhaust portion 250 and a tip end of the protrusion 214 is equal to or greater than 15% of a width W2 of the opening of the exhaust portion 250 in the insertion direction Id. The width W2 is a maximum width of the opening of the exhaust portion 250 in the insertion direction Id. In addition, the protrusion 214 protrudes from the tip end surface 212 such that a second length W3 between the tip end of the protrusion 214 and a lower end of an opening of the inlet portion 230 in the insertion direction Id is equal to or greater than 15% of a width W4 of an opening of the inlet portion 230 in the insertion direction Id. The width W4 is a maximum width of the opening of the inlet portion 230 in the insertion direction Id.

Figure 3:
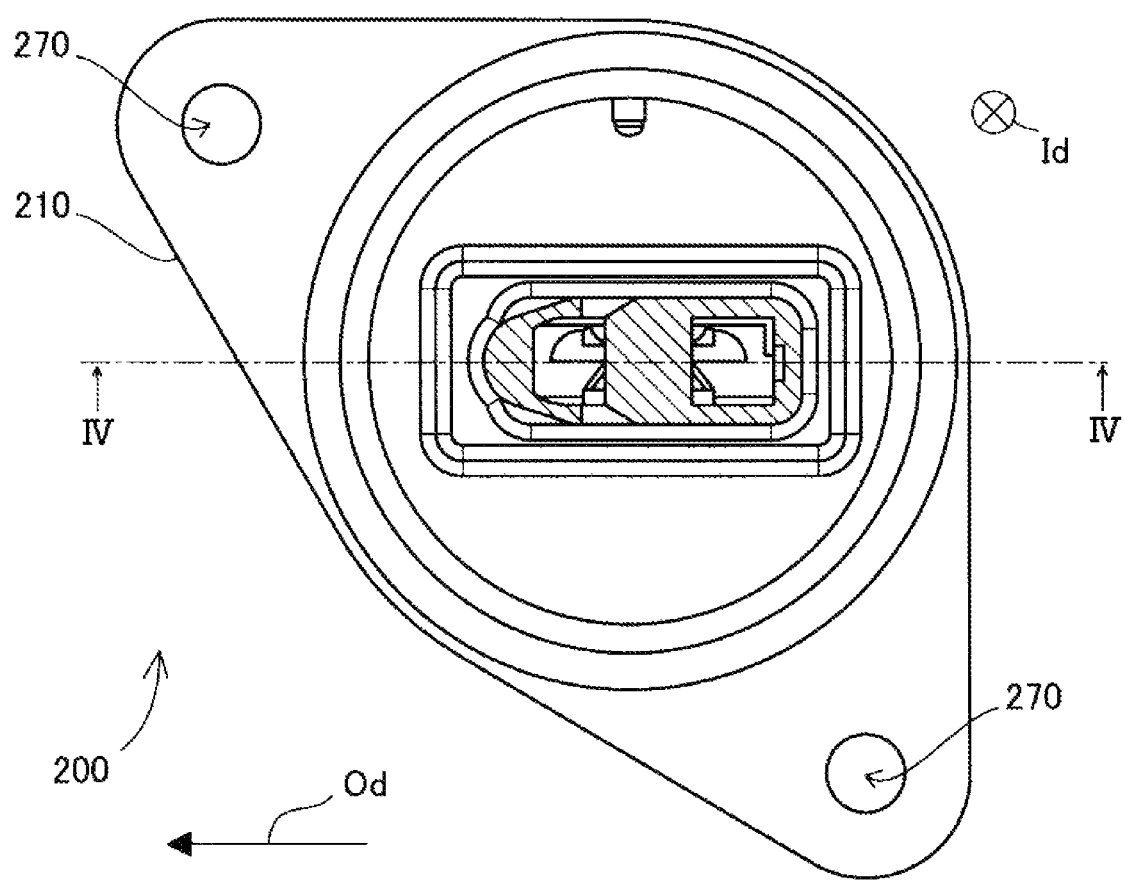
FIG. 3 is a schematic top view of the flowmeter of the embodiment.

As shown in FIG. 3, when the flowmeter 200 is viewed from a side of a base end (i.e., from a top side) of the flowmeter 200 in the insertion direction Id, the housing 210 defines bolt insertion holes 270 for fixing the flowmeter 200 to the main passage 12.

Figure 4:
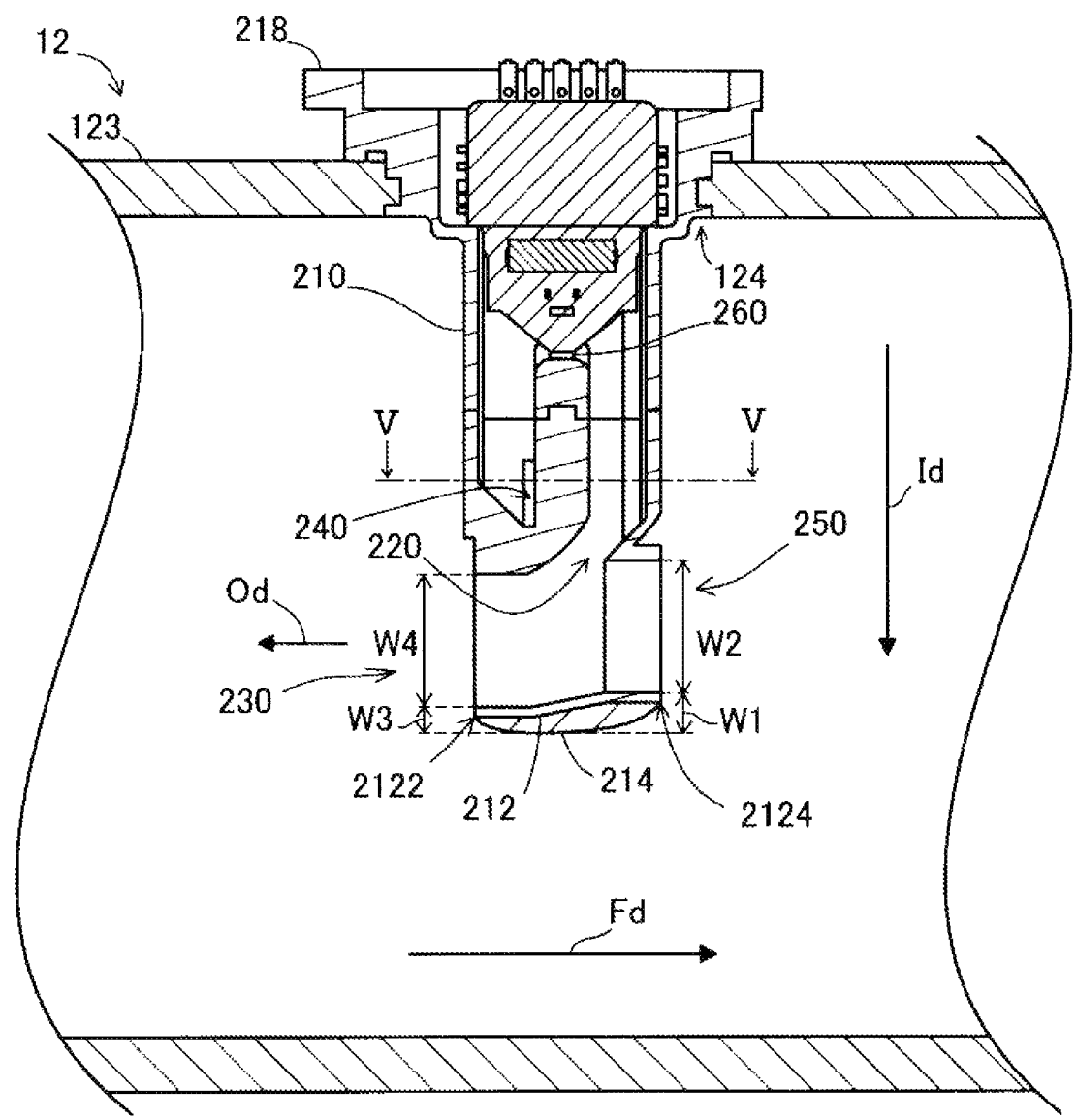
FIG. 4 is a schematic cross-sectional view of a main passage near the flowmeter of the embodiment.

As shown in FIG. 4, the flowmeter 200 defines therein a sub passage 220. A flow rate detector 260 is disposed in the sub passage 220. FIG. 4 is a cross-sectional view of the flowmeter 200 taken along a line IV-IV in FIG. 3. The housing 210 is made of a synthetic resin and includes a sup passage forming portion defining the sub passage 220 and a supporting portion supporting the flow rate detector 260. The first end area 2122 in which the inlet portion 230 is defined is located on an upstream side of the main passage 12 when the flowmeter 200 is attached to the main passage 12. The second end area 2124 is located on a downstream side of the first end area 2122 when the flowmeter 200 is attached to the main passage 12.

Figure 5:
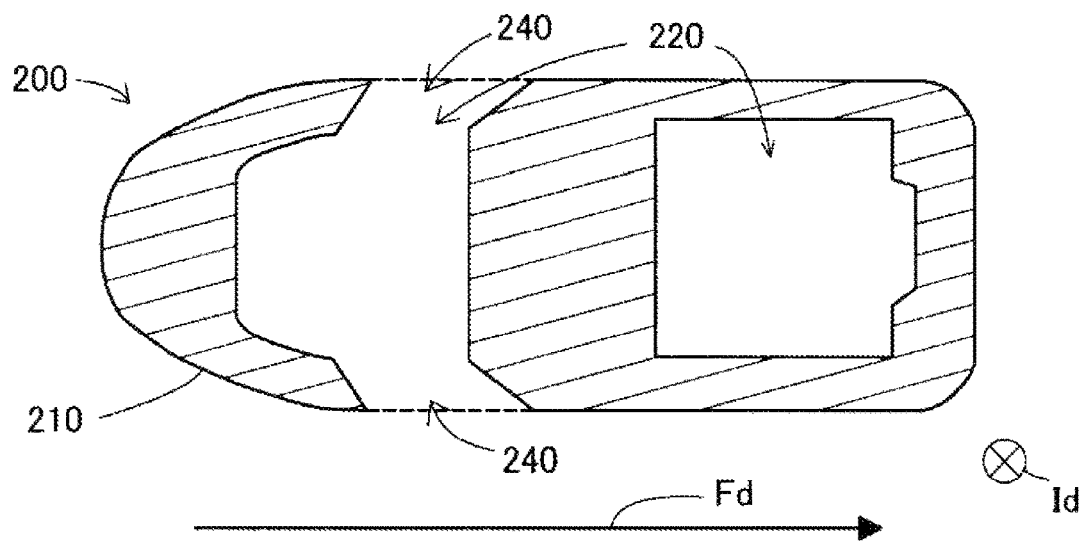
FIG. 5 is a schematic cross-sectional view of the flowmeter of the embodiment.

The sub passage 220 is a passage through which a part of the intake air flowing through the main passage 12 flows. In this embodiment, as shown in FIG. 5 that is a cross-sectional view taken along a line V-V in FIG. 4, the sub passage 220 branches into two passages on a downstream side of the flow rate detector 260. The two branching passages are connected to the two outlet portions 240.

As shown in FIG. 4, the flow rate detector 260 is disposed in a middle of the sub passage 220 and configured to detect a flow rate of the target fluid flowing through the sub passage 220. It is preferable that the flow rate detector 260 can distinguish whether the target fluid flows in a forward direction or a backward direction. In this embodiment, a temperature difference method that is capable of distinguishing the flow direction is used for the flow rate detector 260. In this embodiment, the flow rate detector 260 includes a heater configured to heat the target fluid and multiple temperature sensors arranged along the flow direction of the target fluid, which are not shown. The flow rate detector 260 of this embodiment can detect a flow rate based on the temperature difference between the temperature of an upstream side of the heater and the temperature of a downstream side of the heater. The temperature sensors are disposed in both the upstream side and the downstream side of the heater. Here, in this embodiment, the temperature sensors are thermo-sensitive resistors and the heater is a heat generating resistor.

Figure 6:
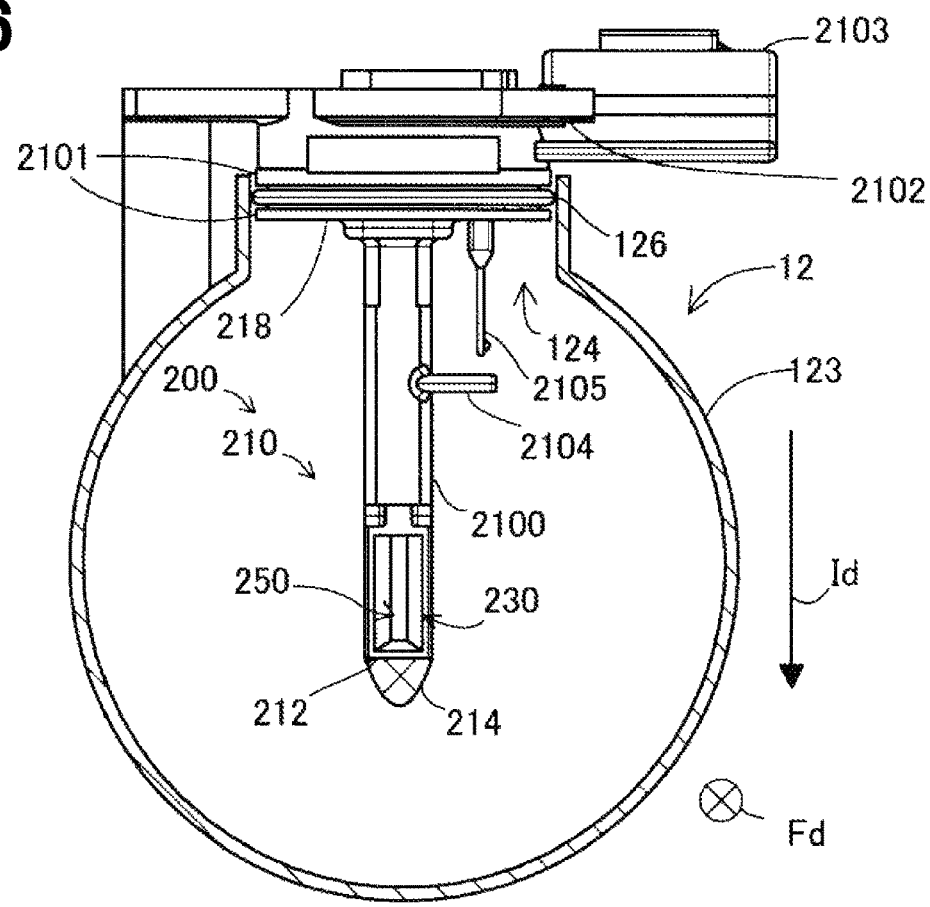
FIG. 6 is a schematic view illustrating an attachment state of the flowmeter of the embodiment viewed from a side of an inlet portion.
Figure 7:
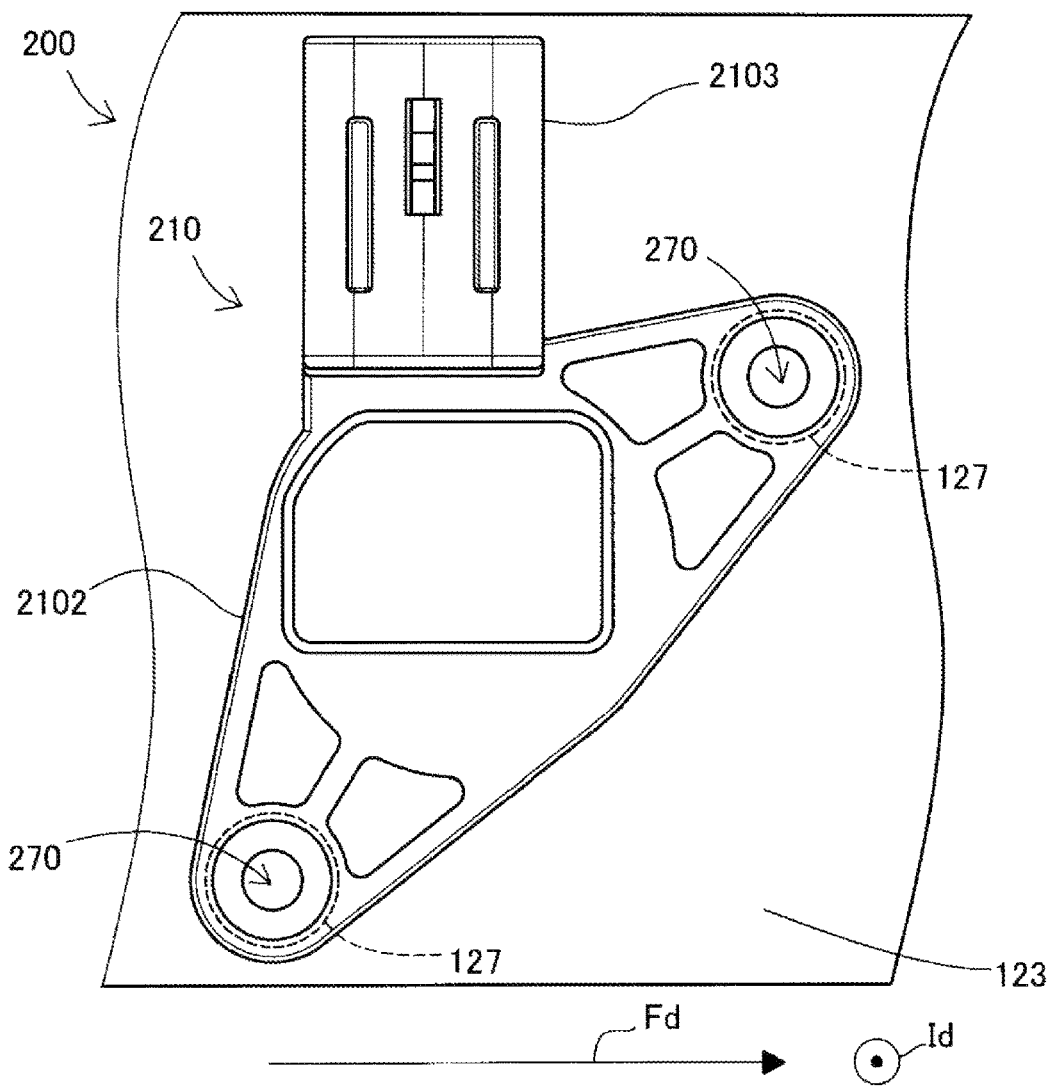
FIG. 7 is a schematic view illustrating the attachment state of the flowmeter viewed from a base side of the flowmeter in an insertion direction.

As shown in FIG. 6, at least a part of the flowmeter 200 is inserted into the main passage 12 through an insertion through hole 124 defined by a cylindrical wall 123 of the pipe defining the main passage 12. The housing 210 includes a housing body 2100 inserted into the main passage 12 in a state where the housing 210 is attached to the main passage 12. The housing 210 includes a ring supporter 2101 integrally provided with the housing body 2100, a flange 2102, a connector 2103, a protection protrusion 2104, and a temperature sensor 2105. The flange 2102 is located on the base end of the housing 210 and serves as a fixing portion at which the flowmeter 200 is fixed to the main passage 12. The connector 2103 is a portion to which a wiring is connected for transmitting measurement results of the flowmeter 200 to an outside. When the flowmeter 200 is attached to the main passage 12, the ring supporter 2101 is attached to the insertion hole 124 through an O ring 126. The temperature sensor 2105 is configured to detect the temperature of the intake air. As shown in FIG. 7, the flange 2102 defines the bolt insertion holes 270. Bolts inserted into the bolt insertion holes 270 are fixed to bosses 127 disposed in the main passage 12.

As shown in FIG. 6, the flowmeter 200 is attached to the main passage 12 such that the flowmeter 200 passes through a center of the main passage 12 when viewed from a side of the inlet portion 230. In this embodiment, the inlet portion 230 through which the intake air flowing through the main passage 12 flows into the flowmeter 200 has the opening that opens in the opening direction Od. The opening direction Id is opposite to a flow direction Fd of the intake air. That is, the inlet portion 230 faces an upstream side of the main passage 12. In FIG. 6, the exhaust portion 250 can be seen in a far side of the inlet portion 230 in the flow direction Fd. As shown in FIG. 6, the exhaust portion 250 has an opening that is smaller than the opening of the inlet portion 230.

Figure 8:
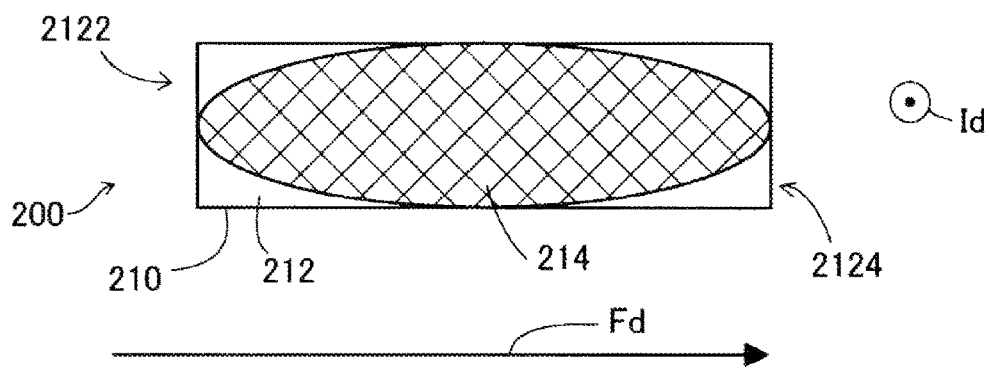
FIG. 8 is a schematic view of the flowmeter viewed from a tip side of the flowmeter.
Figure 9:
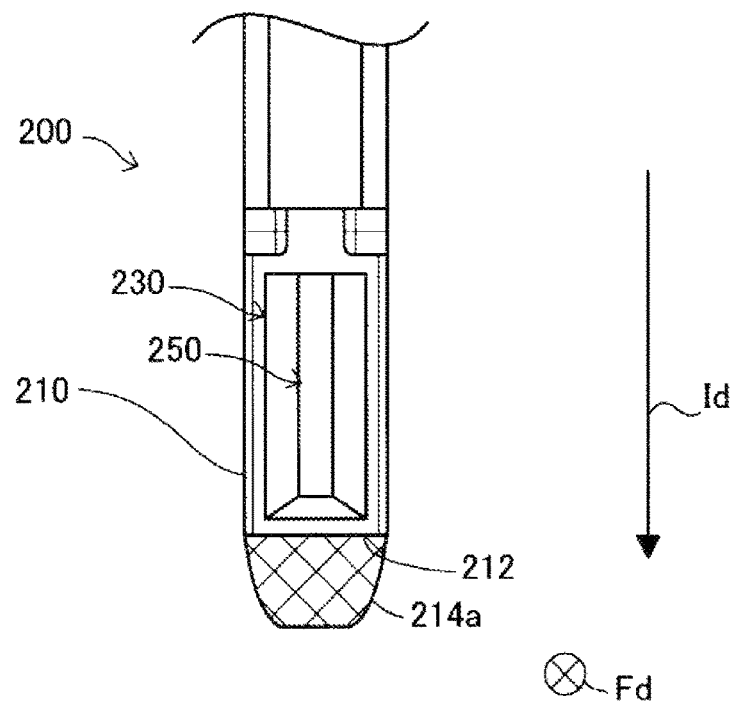
FIG. 9 is a schematic view of a flowmeter of an example of the embodiment viewed from a side of an inlet portion of the flowmeter.
Figure 10:
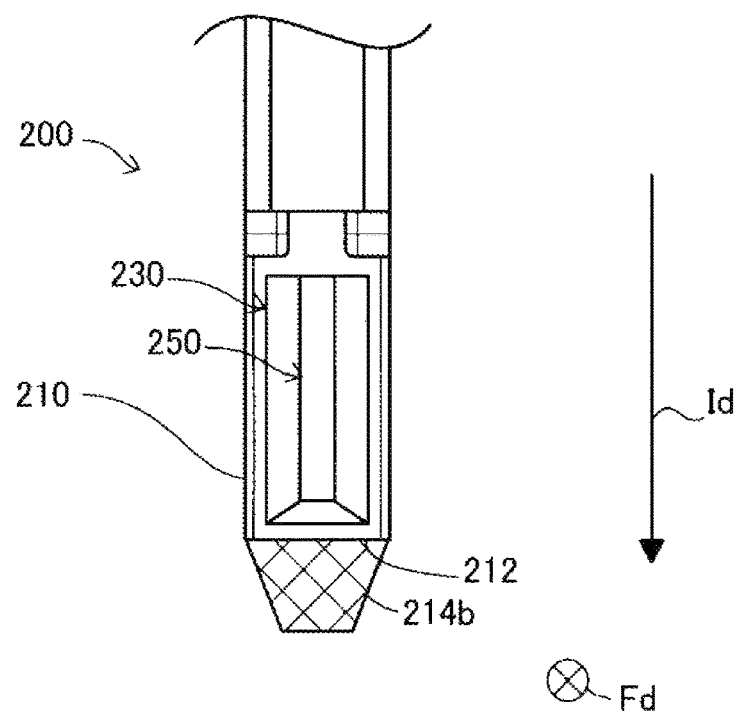
FIG. 10 a schematic view of a flowmeter of an example of the embodiment viewed from a side of an inlet portion of the flowmeter.
Figure 11:
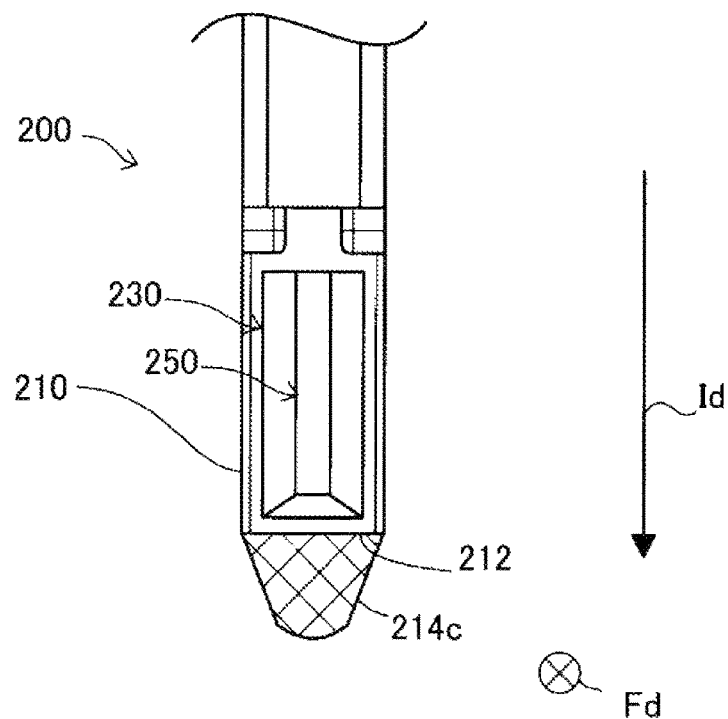
FIG. 11 is a schematic view of a flowmeter of an example of the embodiment viewed from a side of an inlet portion of the flowmeter.
Figure 12:
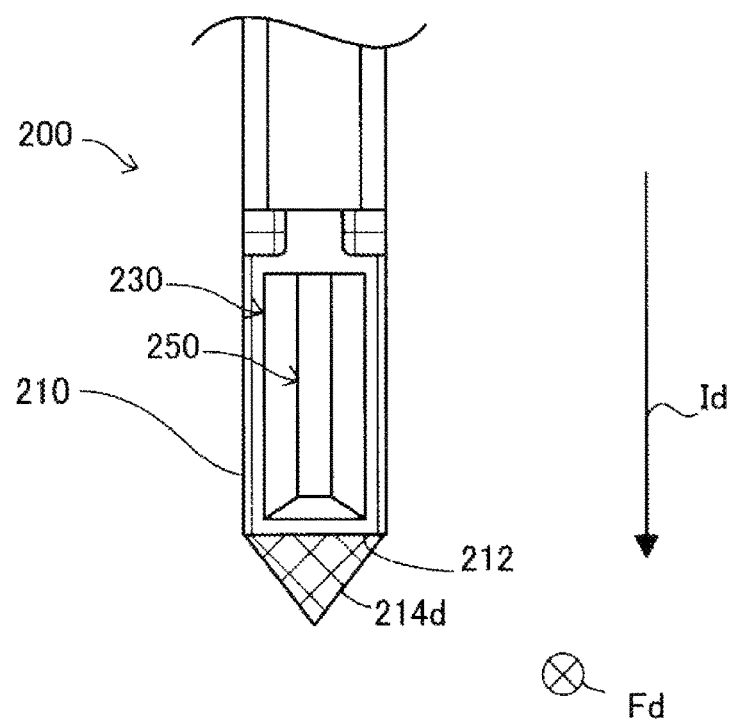
FIG. 12 is a schematic view of a flowmeter of an example of the embodiment viewed from a side of an inlet portion of the flowmeter.

As shown in FIG. 6, the protrusion 214 tapers toward a tip end of the protrusion 214 in the insertion direction Id when viewed from a side of the inlet portion 230. In other words, a dimension of the protrusion 214 in a direction perpendicular to both the insertion direction Id and the opening direction Od decreases toward the tip end. Because of this tapering shape, the protrusion 214 can reduce a resistance received by the intake air when the protrusion 214 is disposed in the main passage 12. Thereby, the intake air is rectified and the intake air can flow smoothly around the protrusion 214. As shown in FIG. 8, the protrusion 214 of this embodiment has an elliptical shape when viewed from a side of the tip end in the insertion direction Id. Portions of the protrusion 214 in the first end area 2122 and the second end area 2124 are curved. The protrusion 214 shows an elongated shape as a whole. Thus, the protrusion 214 can reduce a resistance received by the intake air when the protrusion is disposed in the main passage 12. As a result, the intake air is rectified and can flow more smoothly around the protrusion 214.

As shown in FIG. 2, the protrusion 214 tapers toward the tip end in the insertion direction Id when viewed in the direction perpendicular to both the opening direction Od of the inlet portion 230 and the insertion direction Id, i.e., viewed from sides of portions of the side surfaces in which the outlet portions 240 are defined in this embodiment. In this case, the protrusion 214 can reduce a resistance received by the intake air when the protrusion 214 is disposed in the main passage 12. Thereby, the intake air is rectified and can flow smoothly around the protrusion 214. In this embodiment, the protrusion 214 has a curved surface when viewed from the sides of the portions of the side surfaces.

When the flowmeter 200 is disposed in the main passage 12, a friction occurs between the intake air and the housing 210 of the flowmeter 200. Therefore, a flow velocity of the intake air flowing near the flowmeter 200 decreases in a direction toward a downstream side in a flow of the intake air. Thus, the intake air cannot flow along the shape of the flowmeter 200, which may separate the intake air. For example, in a forward flow state in which the intake air flows from an upstream to a downstream side of the main passage 12, the intake air may separate in the second end area 2124. In a backward flow state in which the intake air flows from the downstream to the upstream side of the main passage 12, the intake air may separate in the first end area 2122. When the intake air is separated, a horizontal vortex of the intake air may be generated. In this embodiment, the horizontal vortex is a vortex having a rotational axis that intersects a plane surface defined by the insertion direction Id and the flow direction Fd.

The protrusion 214 protrudes in the insertion direction Id from a portion of the tip end surface 212 in the second end area 2124 and rectifies a flow of the intake air on a side of the second end area 2124. Thus, the intake air is less likely to be separated from the flowmeter 200 in the second end area 2124 in the forward flow state compared to a case in which the protrusion 214 is not formed in the second end area 2124. As a result, the horizontal vortex can be reduced on the side of the second end area 2124.

Further, in a backward flow state in which the intake air flows from the downstream to the upstream of the main passage 12, a pressure on an upstream side of the first end area 2122 in which the intake air is separated tends to be lower than pressures in other areas. In this case, a horizontal vortex that has a rotational axis extending along a direction intersecting the insertion direction Id of the flowmeter 200 is generated. When the horizontal vortex is generated on a side of the first end area 2122 in the backward flow state, the intake air flowing into the flowmeter 200 through the exhaust portion 250 is restricted from flowing out of the flowmeter 200 through the inlet portion 230. Thereby, the intake air flowing into the flowmeter 200 through the exhaust portion 250 may flow into the sub passage 220. In this case, measurement results of a flow rate of the flowmeter 200 may have an error. The backward flow state occurs when an idling operation is performed in the combustion system 10. When the idling operation is performed, the combustion system 10 prevents the intake air from flowing into the internal combustion engine 11 by closing the intake valve 125. In this case, a pressure of the intake air on a side of the main passage 12 close to the internal combustion engine 11 increases. Therefore, a pressure on the downstream side of the main passage 12 becomes higher than a pressure on the upstream side of the main passage 12 and a backward flow is generated.

The protrusion 214 protrudes in the insertion direction Id from a portion of the tip end surface 212 in the first end area 2122 and rectifies a flow of the intake air on a side of the first end area 2122. Thus, in the backward flow state, the intake air is less likely to be separated from the flowmeter 200 on the side of the first end area 2122 compared to a case in which the protrusion 214 is not disposed in the first end area 2122. As a result, a horizontal vortex generated on the side of the first end area 2122 can be reduced.

According to the flowmeter 200 in this embodiment as described above, the protrusion 214 protrudes from the tip end surface 212 in the insertion direction Id and the protrusion 214 is located in both the first end area 2122 and the second end area 2124. The first end area 2122 is an end area close to the inlet portion 230 and the second end area 2124 is opposite to the first end area 2122. Thus, when the inlet portion 230 is attached to the main passage 12 such that the inlet portion 230 faces in the flow direction Fd of the main passage 12, the intake air is separated at the protrusion 214 that is located in an tip end side of the tip end surface 212. Thus, a distance between the inlet portion 230 or the exhaust portion 250 and a position at which the horizontal vortex is generated can be increased compared to a case without the protrusion 214. Thus, in both the forward flow state and the backward flow state, an influence caused by the horizontal vortex can be reduced. For example, the horizontal vortex is less likely to inhibit the intake air from flowing into the flowmeter 200 through inlet portion and flowing out of the flowmeter 200 through the exhaust portion 250. Therefore, a measurement error of the flowmeter 200 due to the horizontal vortex can be reduced. The protrusion 214 also serves as a rectifier to restrict the horizontal vortex from generating. As a result, a measurement error of the flowmeter 200 can be further reduced.

According to the flowmeter 200 described above, the protrusion 214 extends from the first end area 2122 to the second end area 2124. In this case, a horizontal vortex between the first end area 2122 and the second end area 2124, which would be generated if the protrusion 214 does not extend from the first end area 2122 to the second end area 2124, is restricted from generating. Thus, a rectifying property is improved compared to a case in which the protrusion 214 is not consistent between the first end area 2122 and the second end area 2124.

Further, in the above described flowmeter 200, the protrusion 214 protrudes from the tip end surface 212 such that the first length W1 is equal to or greater than 15% of the width W2 of the opening of the exhaust portion 250. Thus, it is easy to increase a distance between the exhaust portion 250 and a position at which the horizontal vortex is generated. In addition, the protrusion 214 protrudes from the tip end surface 212 such that the second length W3 is equal to or greater than the width W4 of the opening of the inlet portion 230. Thus, it is easy to improve an effect to suppress an influence of the horizontal vortex both in the forward flow state and the backward flow state. Thus, it is easy to increase a distance between the inlet portion 230 and the position at which the horizontal vortex is generated in the backward flow state. Additionally, if the first length W1 and the second length W3 are long, the protrusion 214 can be easily formed into the tapering shape.

B. Other Embodiment

B1. First Examples

A shape of the protrusion 214 of the flowmeter 200 of this embodiment can be appropriately altered while the protrusion 214 protrudes in the insertion direction Id and is located in both the first end area 2122 and the second end area 2124. In the following, with reference to FIGS. 9 through 32, applicable examples of the shape of the protrusion 214 will be described.

Figure 13:
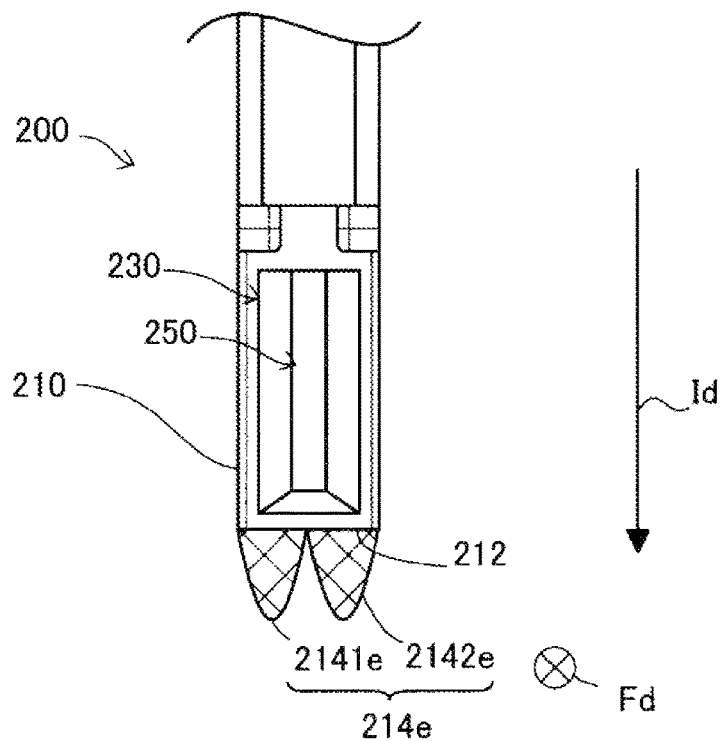
FIG. 13 is a schematic view of a flowmeter of an example of the embodiment viewed from a side of an inlet portion of the flowmeter.
Figure 14:
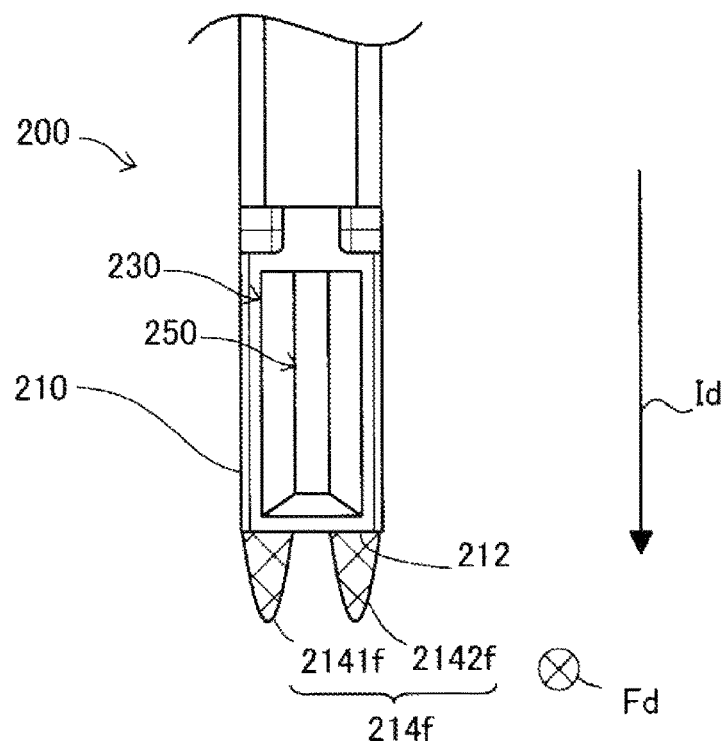
FIG. 14 is a schematic view of a flowmeter of an example of the embodiment viewed from a side of an inlet portion of the flowmeter.
Figure 15:
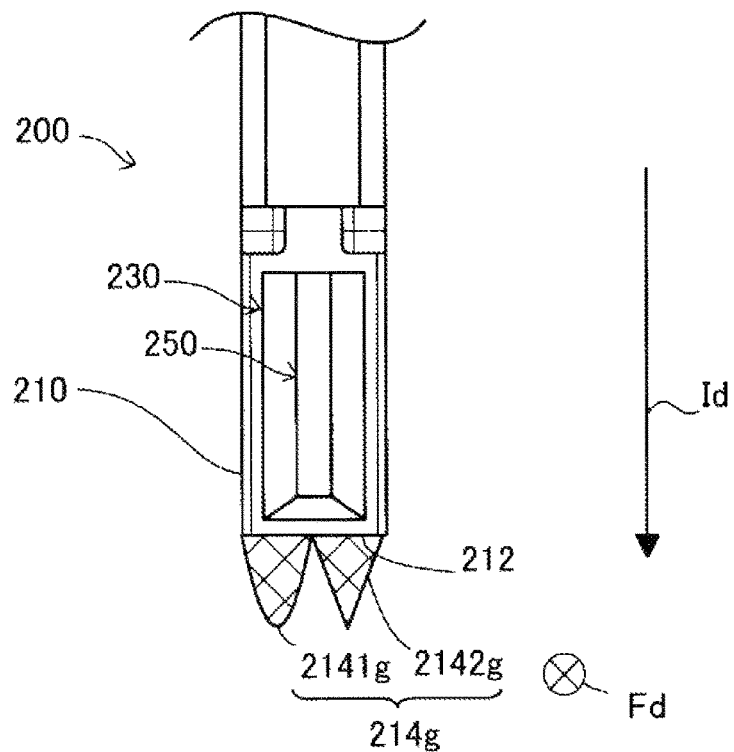
FIG. 15 is a schematic view of a flowmeter of an example of the embodiment viewed from a side of an inlet portion of the flowmeter.
Figure 16:
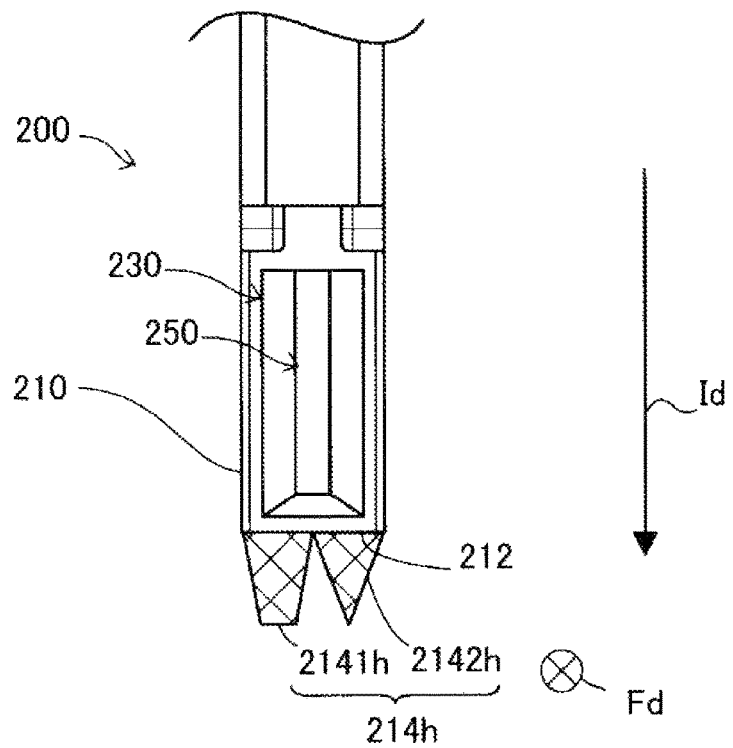
FIG. 16 is a schematic view of a flowmeter of an example of the embodiment viewed from a side of an inlet portion of the flowmeter.
Figure 17:
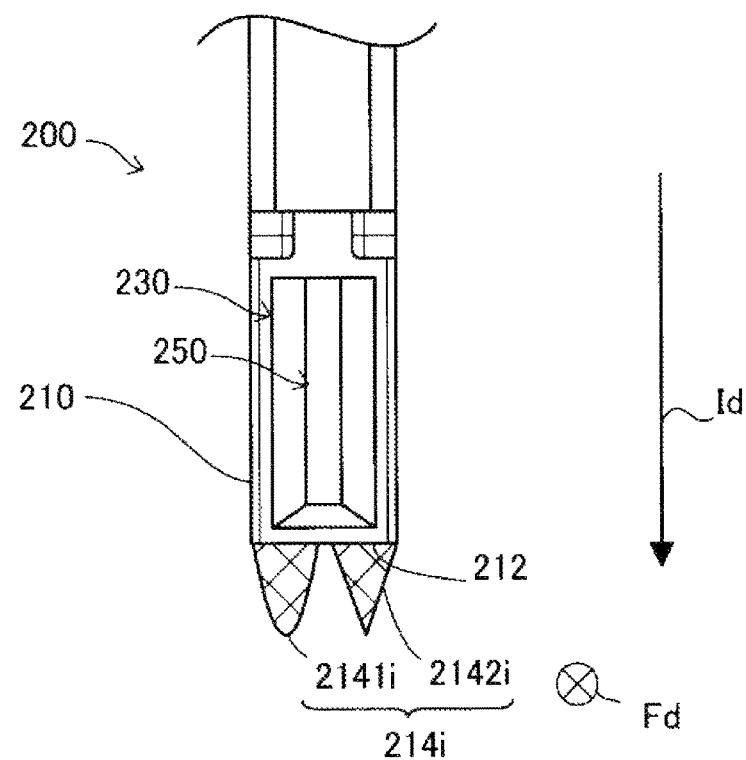
FIG. 17 is a schematic view of a flowmeter of an example of the embodiment viewed from a side of an inlet portion of the flowmeter.
Figure 18:
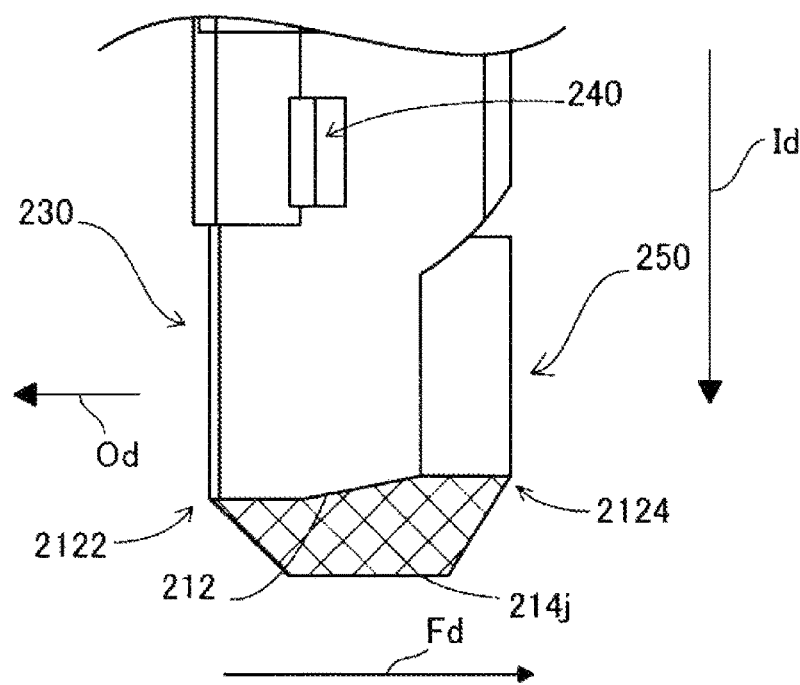
FIG. 18 is a schematic view of a flowmeter of an example of the embodiment viewed from a side of a side surface of the flowmeter.
Figure 19:
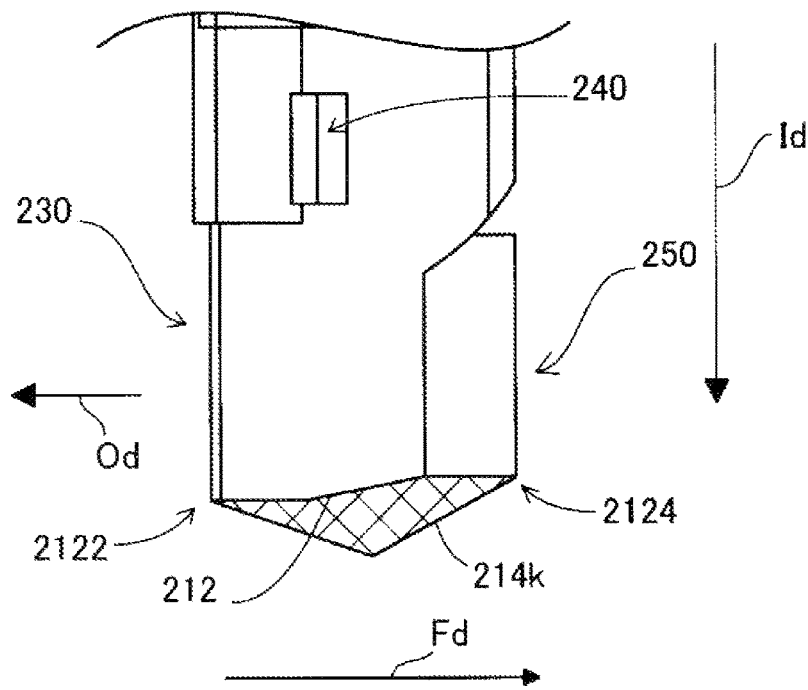
FIG. 19 is a schematic view of a flowmeter of an example of the embodiment viewed from a side of a side surface of the flowmeter.
Figure 20:
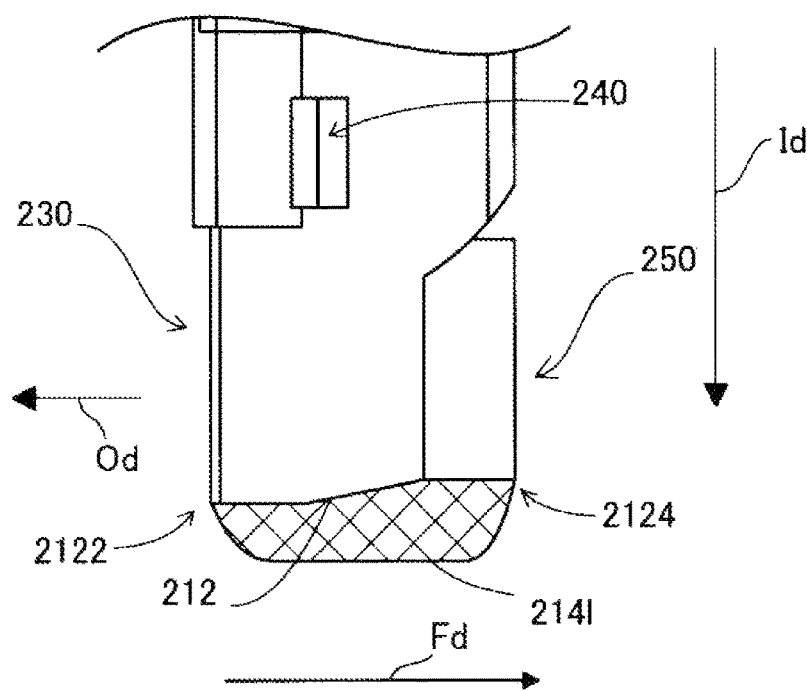
FIG. 20 is a schematic view of a flowmeter of an example of the embodiment viewed from a side of a side surface of the flowmeter.
Figure 21:
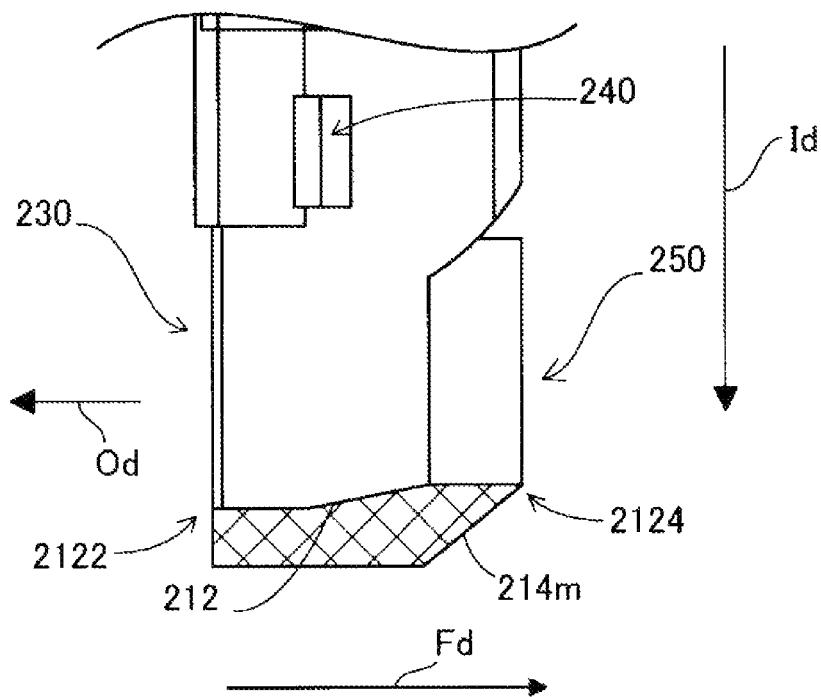
FIG. 21 is a schematic view of a flowmeter of an example of the embodiment viewed from a side of a side surface of the flowmeter.
Figure 22:
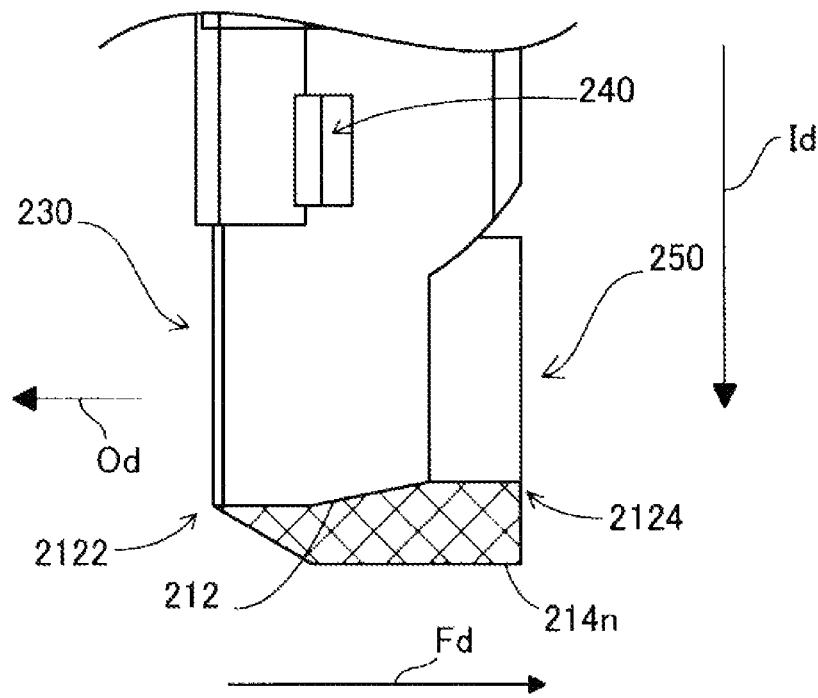
FIG. 22 is a schematic view of a flowmeter of an example of the embodiment viewed from a side of a side surface of the flowmeter.
Figure 23:
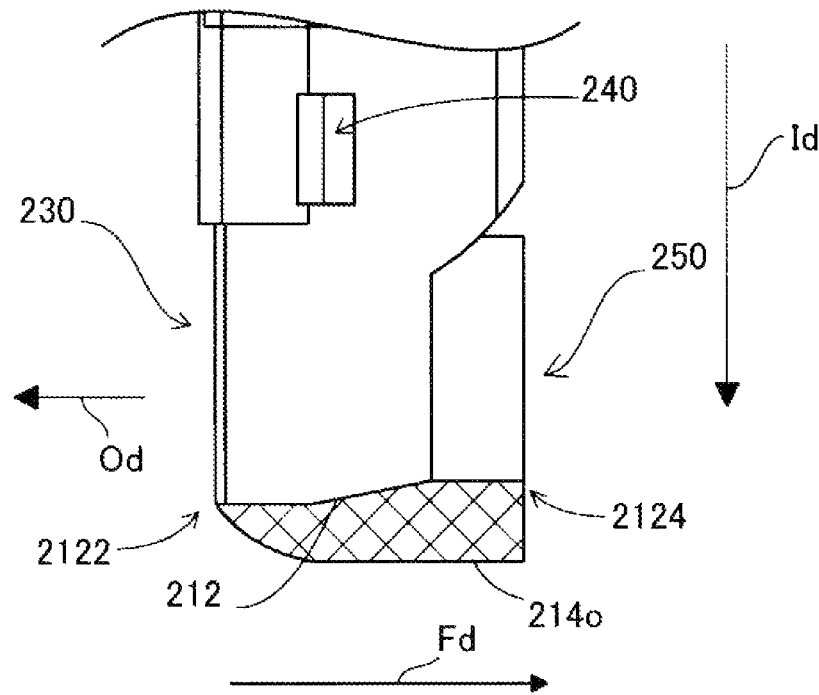
FIG. 23 is a schematic view of a flowmeter of an example of the embodiment viewed from a side of a side surface of the flowmeter.
Figure 24:
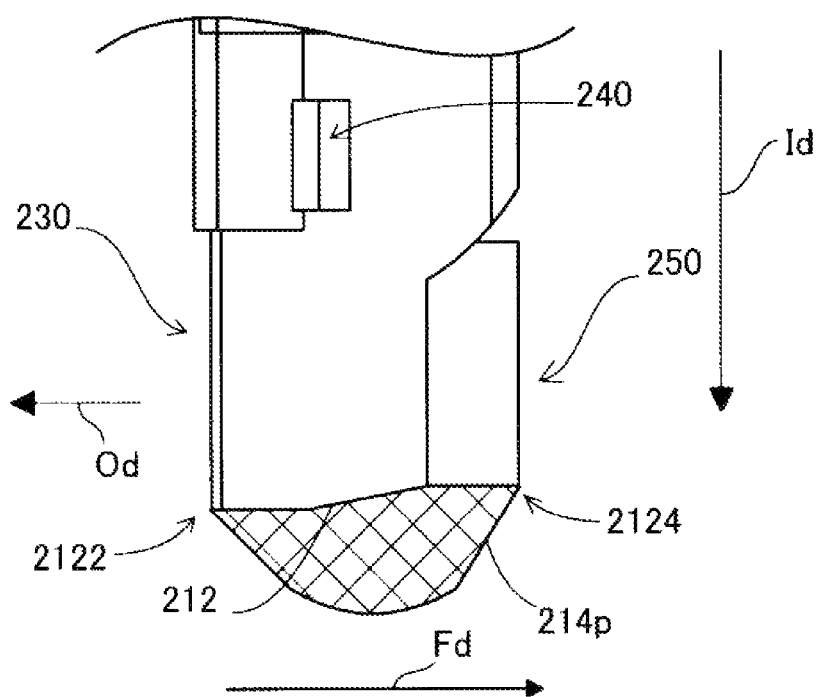
FIG. 24 is a schematic view of a flowmeter of an example of the embodiment viewed from a side of a side surface of the flowmeter.

As shown by protrusions 214a to 214d in FIG. 9 through FIG. 12, the protrusion 214 may have other shapes while the protrusion 214 tapers toward the tip end when viewed from a side of the inlet portion 230. For example, the protrusion 214a in FIG. 9 has a flat end surface located in the tip end of the protrusion 214a in the insertion direction Id. The protrusion 214b in FIG. 10 includes a flat end surface, similar to the above-described flat end surface, located in the tip end of the protrusion 214b in the insertion direction Id and side surfaces that are flat and tilted. The protrusion 214c in FIG. 11 includes side surfaces, similar to the side surfaces of the protrusion 214b shown in FIG. 10 that are flat and tilted. The side surfaces have end portions in the insertion direction Id that are curved. The protrusion 214d in FIG. 12 has side surfaces tilted similarly to the protrusions 214b and 214c shown in FIGS. 10 and 11. The tip end of the protrusion 214d in the insertion direction Id is sharp. As shown in FIGS. 13 and 14, the flowmeter 200 may have multiple protrusion elements. In this case, as shown in FIG. 13, the multiple protrusion elements 2141e and 2142e may be arranged adjacent to each other in a direction perpendicular to both the insertion direction Id and the opening direction Od. As shown in FIG. 14, the multiple protrusion elements 2141f and 2142f may be arranged with a gap therebetween in the direction perpendicular to both the insertion direction Id and the opening direction Od. As shown in FIGS. 15 through 17, when the flowmeter 200 includes protrusions 214g to 214i having multiple protrusion elements, each of the multiple protrusion elements may have different shapes with each other. For example, in the protrusion 214g shown in FIG. 15, one protrusion element 2141g is formed by a curved surface. The other protrusion element 2142g has a sharp tip end in the insertion direction Id and tilted side surfaces. In the protrusion 214h shown in FIG. 16, one protrusion element 2141h has side surfaces that are flat and tilted and a flat end surface located in the tip end of the protrusion element 2141h in the insertion direction Id. The other protrusion element 2142h has side surfaces that are tilted and a sharp tip end in the insertion direction Id. In the protrusion 214i shown in FIG. 17, one protrusion element 2141i is formed by a curved surface. The other protrusion element 2142i has side surfaces that are tilted and a sharp tip end in the insertion direction Id.

As shown in FIGS. 18 through 24, a shape of each of the protrusion 214j to 214p viewed in the direction perpendicular to both the opening direction Od of the inlet portion 230 and the insertion direction Id, i.e., viewed from the a side of the side surface, may be different from the embodiment described above. In the protrusion 214j in FIG. 18, a portion of the protrusion 214j in the first end area 2122 and a portion of the protrusion 214j in the second end area 2124 are tilted to the tip end in the insertion direction Id. The protrusion 214j has a tip end surface in the insertion direction Id that is flat when viewed from a side of the side surface. In the protrusion 214k in FIG. 19, a portion of the protrusion 214k in the first end area 2122 and a portion of the protrusion 214k in the second end area 2124 are tilted to the tip end of the protrusion 214k in the insertion direction Id. The tip end of the protrusion 214k is sharp when viewed from a side of the side surface. In the protrusion 214l in FIG. 20, a portion of the protrusion 214l in the first end area 2122 and a portion of the protrusion 214l in the second end area 2124 have curved surfaces and the protrusion 214l has a tip end surface in the insertion direction Id that is flat when viewed from a side of the side surface. In the protrusion 214m in FIG. 21, a portion of the protrusion 214m in the first end area 2122 extends in the insertion direction Id and a portion of the protrusion 214m in the second end area 2124 is tilted toward the tip end in the insertion direction Id when viewed from a side of the side surface. The protrusion 214m has a tip end surface in the insertion direction Id that is flat. In the protrusion 214n shown in FIG. 22, a portion of the protrusion 214n in the first end area 2122 is tilted toward the tip end in the insertion direction Id and a portion of the protrusion 214n in the second end area 2124 extends in the insertion direction Id when viewed from a side of the side surface. The protrusion 214n includes a tip end surface in the insertion direction Id that is flat. In the protrusion 214o shown in FIG. 23, a portion of the protrusion 214o in the first end area 2122 has a curved shape and a portion of the protrusion 214o in the second end area 2124 extends in the insertion direction Id when viewed from a side of the side surface. The protrusion 214o has a tip end surface in the insertion direction Id that is flat. In the protrusion 214p shown in FIG. 24, a portion of the protrusion 214p in the first end area 2122 and a portion of the protrusion 214p in the second end area 2124 are tilted to a tip end in the insertion direction Id. The tip end of the protrusion 214p is curved.

Figure 25:
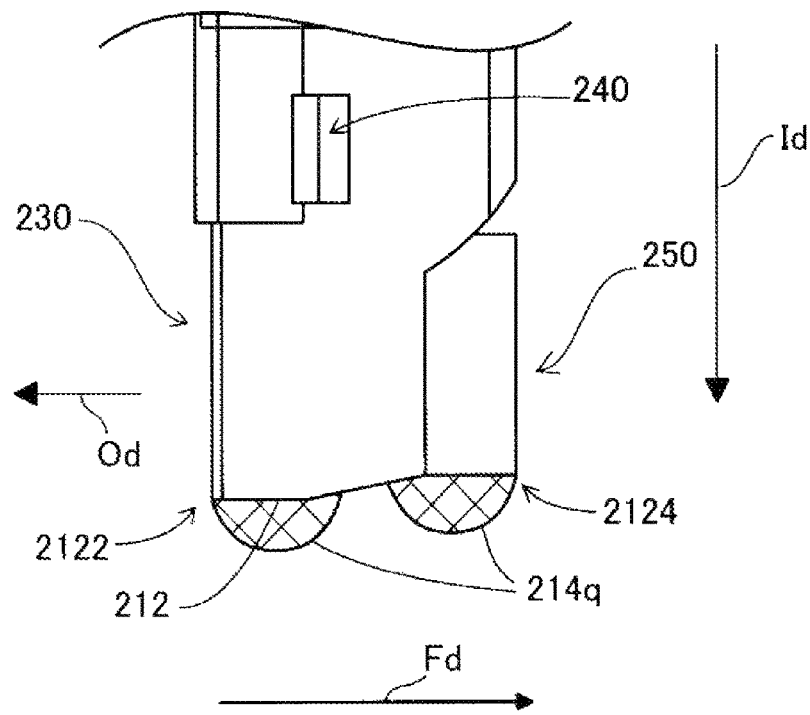
FIG. 25 is a schematic view of a flowmeter of an example of the embodiment viewed from a side of a side surface of the flowmeter.
Figure 26:
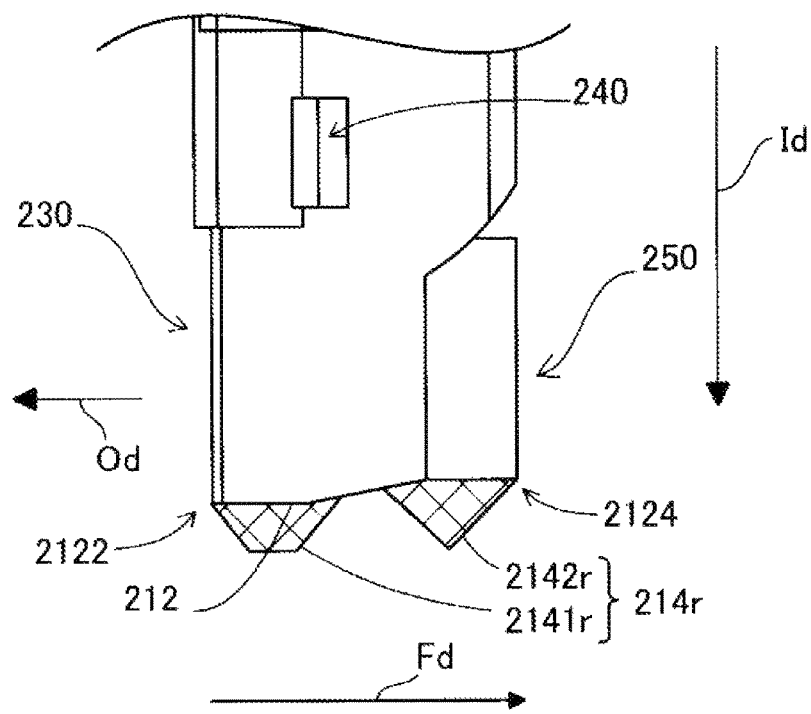
FIG. 26 is a schematic view of a flowmeter of an example of the embodiment viewed from a side of a side surface of the flowmeter.
Figure 27:
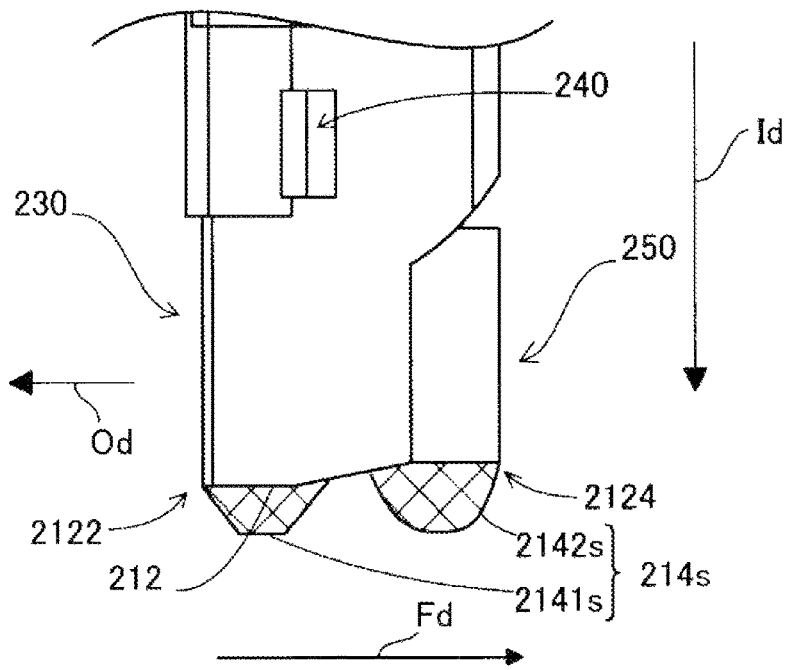
FIG. 27 is a schematic view of a flowmeter of an example of the embodiment viewed from a side of a side surface of the flowmeter.

As shown in FIGS. 25 through 27, the flowmeter 200 may have a part of the tip end surface that does not include protrusion 214q to 214s between the first end area 2122 and the second end area 2124. For example in the protrusion 214q in FIG. 25, a protrusion element 2141q is located in the first end area 2122 and a protrusion element 2142q is located in the second end area 2124. The protrusion elements 2141q and 2142q have curved shapes. In case that the flowmeter 200 has a part of the tip end surface that does not include protrusion 214r and 214s between the first end area 2122 and the second end area 2124, the shapes of the protrusions 214r and 214s located in the first end area 2122 and the second end area 2124 may be different with each other. For example, in the protrusion 214r shown in FIG. 26, the protrusion element 2141r located in the first end area 2122 has a tilted surface on a side of the first end area 2122 of the protrusion element 2141r and a tilted surface on a side of the second end area 2124 of the protrusion element 2141r. A tip end surface of the protrusion element 2141r in the insertion direction Id has a flat surface. The protrusion element 2142r located in the second end area 2124 has a tilted surface on a side of the first end area 2122 of the protrusion element 2142r and a tilted surface on a side of the second end area 2124 of the protrusion element 2142r. The protrusion element 2142r has a sharp tip end in the insertion direction Id. In the protrusion element 214s shown in FIG. 27, the protrusion element 2141s located in the first end area 2122 has a tilted surface located on a side of the first end area 2122 of the protrusion element 2141s and a tilted surface located on a side of the second end area 2124 of the protrusion element 2141s. A tip end surface of the protrusion element 2141s in the insertion direction Id has a flat surface. The protrusion element 2142s located in the second end area 2124 has a curved shape.

Figure 28:
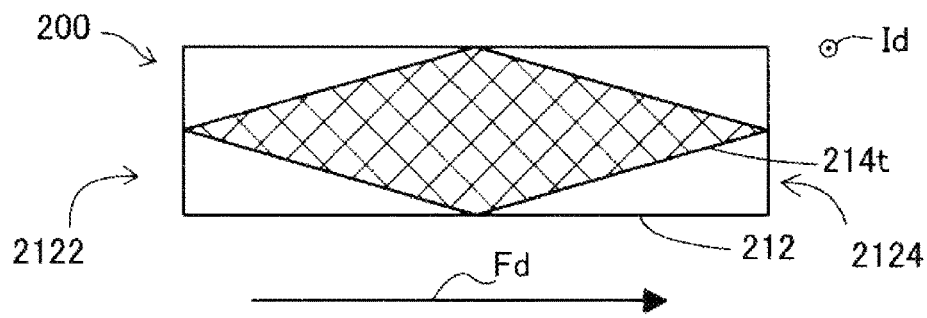
FIG. 28 is a schematic view of a flowmeter of an example of the embodiment viewed from a side of a tip end of the flowmeter.
Figure 29:
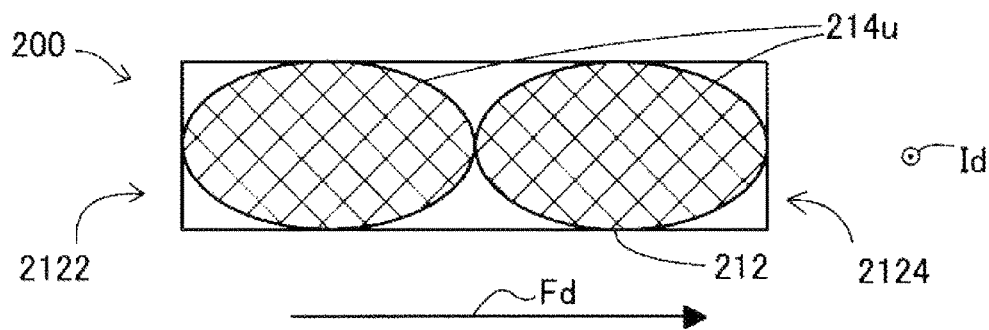
FIG. 29 is a schematic view of a flowmeter of an example of the embodiment viewed from a side of a tip end of the flowmeter.
Figure 30:
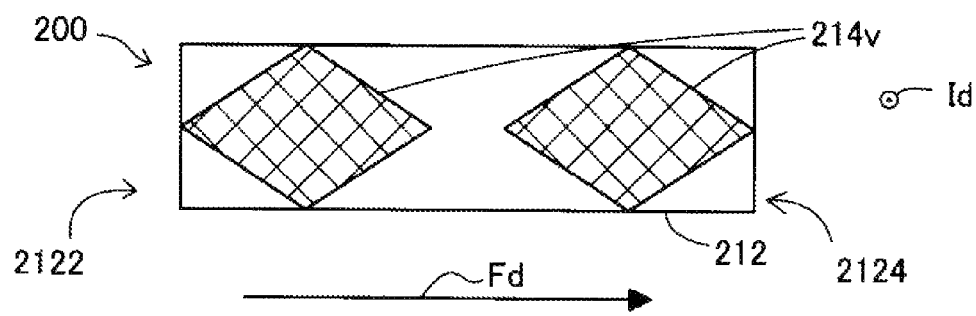
FIG. 30 is a schematic view of a flowmeter of an example of the embodiment viewed from a side of a tip end of the flowmeter.

As shown in FIGS. 28 through 30, a shape of the protrusion viewed from a side of the tip end in the insertion direction Id may be different from that of the embodiment, as shown in protrusions 214t to 214v. For example, the protrusion 214t shown in FIG. 28 has a diamond shape when viewed from a side of the tip end. The flowmeter 200 may include multiple protrusion elements like protrusions 214u and 214v. In this case, as shown in protrusions 214u and 214v shown in FIGS. 29 and 30, the flowmeter 200 may include two protrusion elements arranged along the flow direction Fd. Concretely, the protrusion 214u in FIG. 29 has two protrusion elements 2141u and 2142u each of which has an elliptical shape when viewed from a side of the tip end. The protrusion 214v shown in FIG. 30 has two protrusion elements 2141v and 2142v each of which has a diamond shape when viewed from a side of the tip end.

Figure 31:
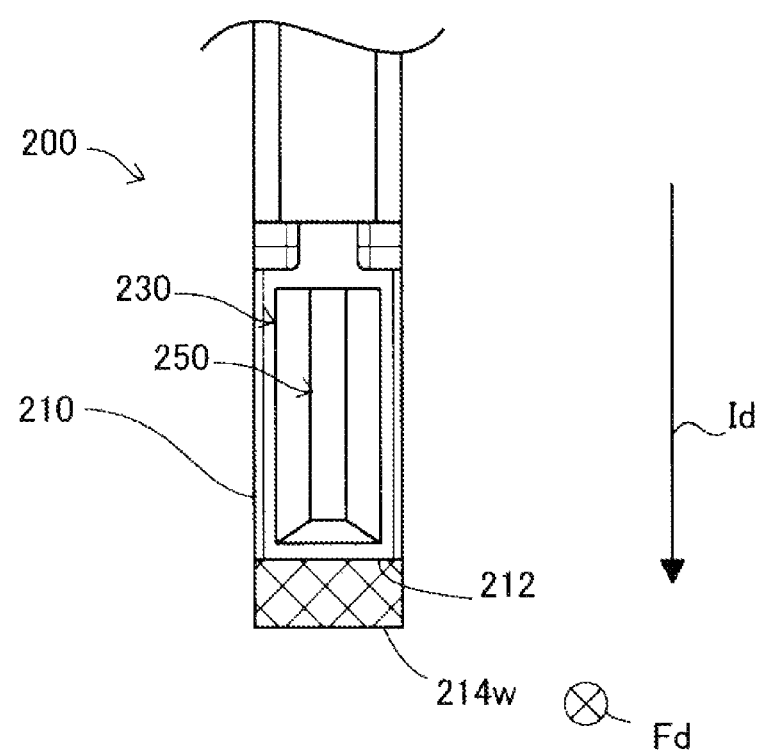
FIG. 31 is a schematic view of a flowmeter of an example of the embodiment viewed from a side of an inlet portion of the flowmeter.

In the embodiment described above, the protrusion 214 tapers toward the tip end in the insertion direction Id when viewed in a direction facing the inlet portion 230, but the shape of the protrusion 214 is not limited to this. For example, as shown in FIG. 31, a protrusion 214w may have a constant width in the insertion direction Id when viewed from a side of the inlet portion 230.

Figure 32:
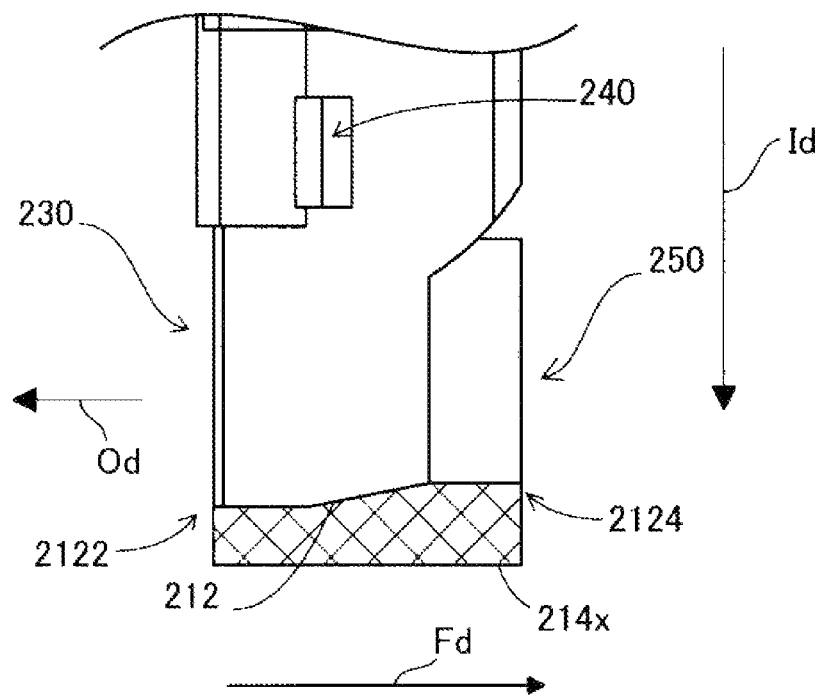
FIG. 32 is a schematic view of a flowmeter of an example of the embodiment viewed from a side of a side surface of the flowmeter.

In the embodiment described above, the protrusion 214 tapers toward the tip end in the insertion direction Id when viewed from a side of the side surface. But the shape of the protrusion 214 is not limited to this. For example, as shown in FIG. 32, a protrusion 214x may have a constant width in the insertion direction Id when viewed from a side of the side surface.

B2. Second Examples

Figure 33:
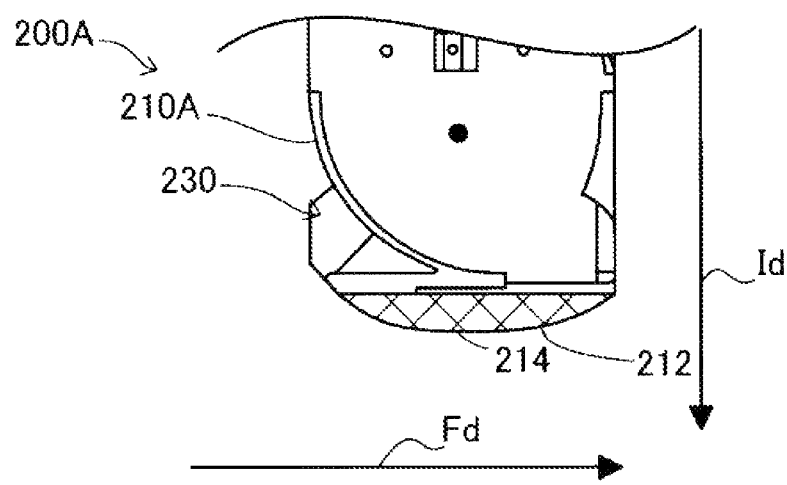
FIG. 33 is a schematic view of a flowmeter of an example of the embodiment viewed from a side of a side surface of the flowmeter.
Figure 34:
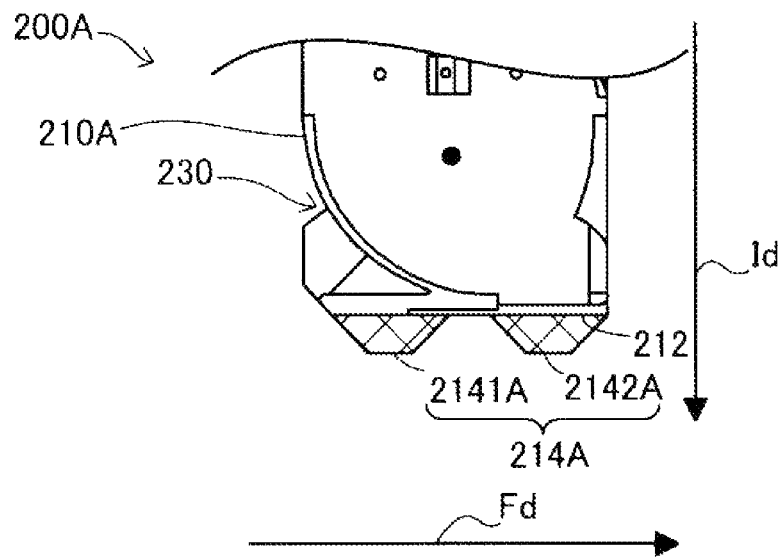
FIG. 34 is a schematic view of a flowmeter of an example of the embodiment viewed from a side of a side surface of the flowmeter.
Figure 35:
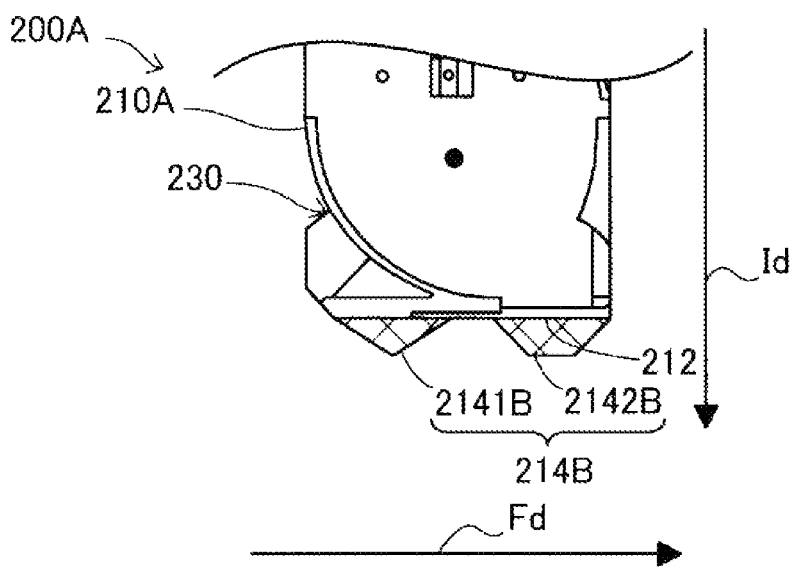
FIG. 35 is a schematic view of a flowmeter of an example of the embodiment viewed from a side of a side surface of the flowmeter.

As shown in FIG. 33, the flowmeter 200A may have a housing 210A having a different configuration with that of the embodiment. The flowmeter 200A may not define branching passages on a downstream side of the sub passage 220. The outlet portion 240 may be one. The outlet portion 240 may be formed in a wall surface located in the second end area 2124. As shown in FIGS. 34 and 35, the flowmeter 200A may have protrusions 214A and 214B that have various shapes. As shown in FIGS. 34 and 35, the flowmeter 200A may have protrusion 214A, 214B having multiple protrusion elements. As shown in FIG. 34, each of the protrusion elements 2141A and 2142A has flat tilted side surfaces and a flat tip end surface in the insertion direction Id. As shown in FIG. 35, a protrusion element 2141B of the protrusion 214B has flat tilted side surfaces and a sharp tip end in the insertion direction Id. The other protrusion element 2142B has flat tilted side surfaces and a flat tip end surface in the insertion direction Id.

B3. Third Example

In the embodiment described above, a part of the flowmeter 200 is inserted into the main passage 12 but the flowmeter 200 may be entirely inserted into the main passage 12 and fixed to the main passage 12.

B4. Fourth Example

In the embodiment described above, the flowmeter 200 may define a different passage structure. For example, the number of the outlet portions may be three or more. The number of the inlet portion 230 may be two or more. The flowmeter 200 does not necessarily include the exhaust portion 250.

B5. Fifth Example

In the embodiment described above, the flowmeter 200 is used in the combustion system 10, but may be used for a system other than the combustion system 10. For example, the flowmeter 200 may be attached to an air supply pipe of an air supply system in a fuel cell system that uses air as an oxidant gas.

B6. Sixth Example

In the above embodiment, the protrusion 214 protrudes from the tip end surface 212 such that the first length W1 is equal to or greater than 15% of the width W2 of the opening of the exhaust portion 250. The protrusion 214 protrudes from the tip end surface 212 such that the second length W3 is equal to or greater than 15% of the width W4 of the opening of the inlet portion 230. However, a size of the protrusion 214 is not limited to this. For example, a length of the protrusion 214 is set to a value to reduce an influence by a horizontal vortex in both the forward flow state and the backward flow state. Specifically, the protrusion 214 may be protrude such that the first length W1 is equal to or greater than 10% of the width W2 of the opening of the exhaust portion 250. Even in this case, the protrusion 214 can reduce the influence by the horizontal vortex in the forward flow state compared to a case in which the first length W1 is less than 10% of the width W2. The protrusion 214 may protrude such that the second length W3 is equal to or greater than 10% of the width W4 of the opening of the inlet portion 230. Even in this case, the influence by the horizontal vortex can be reduced in the backward flow state compared to a case in which the second length W3 is less than 10% of the width W4. It is preferable that the protrusion 214 protrudes such that the first length W1 is equal to or greater than 15% of the width W2 of the opening of the exhaust portion 250. It is preferable that the protrusion 214 protrudes such that the second length W3 is equal to or greater than 15% of the width W4.

According to first to sixth examples of this embodiment, same advantages as those of the embodiment can be obtained in the same configurations as those of the embodiment.

The present disclosure should not be limited to the embodiments described above, and various other embodiments may be implemented without departing from the scope of the present disclosure. For example, the technical features in the present embodiment corresponding to the technical features in the aspect described in the summary may be replaced or combined as appropriate in order to solve a part or all of the above-described issues, or to achieve a part or all of the above-described effects. Also, if the technical features are not described as essential in the present specification, they can be deleted as appropriate.

What is claimed is:

1. A flowmeter inserted into, and fixed to, a main passage through which a target fluid flows, the flowmeter being configured to measure a flow rate of the target fluid in the main passage, the flowmeter comprising:
 a housing including:
  a side surface that extends in an insertion direction of the flowmeter; and
  a tip end surface that is located on a side of the side surface in the insertion direction;
 a sub passage that is defined in the housing, a part of the target fluid flowing into the sub passage from the main passage;

an inlet portion that is defined in the side surface, the target fluid flowing into the sub passage through the inlet portion from the main passage;

an outlet portion through which the target fluid flows out of the sub passage into the main passage;

a flow rate detector that is configured to detect the flow rate of the target fluid flowing through the sub passage; and a protrusion that protrudes from the tip end surface in the insertion direction, wherein the tip end surface includes a first end area located close to the inlet portion and a second end area opposite to the first end area, the protrusion is located in both the first end area and the second end area; and the protrusion includes a plurality of protrusion elements that are disposed in the first end area and the second end area.

2. The flowmeter according to claim 1, wherein the protrusion extends from the first end area to the second end area.

3. The flowmeter according to claim 1, wherein the protrusion tapers in the insertion direction when viewed from a side of the inlet portion.

4. The flowmeter according to claim 1, wherein the inlet portion opens in an opening direction, and the protrusion tapers in the insertion direction when viewed in a direction perpendicular to both the insertion direction and the opening direction.

* * * * *